Aug. 15, 1967  J. CRIPPS  3,336,553

ELECTRIC WINDINGS

Filed Nov. 30, 1964  2 Sheets-Sheet 1

INVENTOR
JOHN CRIPPS
BY
Orland M. Christensen
ATTORNEY

United States Patent Office 3,336,553
Patented Aug. 15, 1967

3,336,553
ELECTRIC WINDINGS
John Cripps, Elkstone, England, assignor to Dowty Rotol Limited, Gloucester, England, a British company
Filed Nov. 30, 1964, Ser. No. 414,752
Claims priority, application Great Britain, Dec. 4, 1963, 47,895/63
5 Claims. (Cl. 336—197)

This invention relates to electric windings and to a method of producing such windings.

According to the invention an electric winding comprises a former wound with conductors having inorganic material providing them with only part insulation, the assembly being reinforcibly impregnated by a solidified ceramic or like material which provides the remainder of the insulation of the conductors. The external surface or surfaces of the windings so formed may have a coating such as to render the assembly impervious to the ingress of moisture.

The inorganic material with which the conductors are partly insulated may be glass fibre from which the organic constituents of the binder have been removed.

The surface coating may be vitreous enamel.

Also, according to the invention, a method of producing an electric winding comprises;

(a) winding upon a former, conductors coated with an inorganic material itself impregnated with a binder,
(b) heating the assembly to drive off organic constituents of the binder from the inorganic material in the coating of the conductors, thereby leaving the conductors only partly insulated, and,
(c) impregnating the assembly with, or immersing the assembly in, a ceramic or like material in a fluid state, thereby reinforcibly completing the insulation of the conductors throughout the assembly when this material attains the solidified state.

The method may further include the step of coating the external surface or surfaces of the assembly with a material of such nature as to render the assembly impervious to the ingress of moisture.

A winding so produced is provided with relatively high temperature-resisting characteristics, and thus may form part of an electrical machine which is required to operate in zones where relatively high temperatures prevail.

Figure 1:
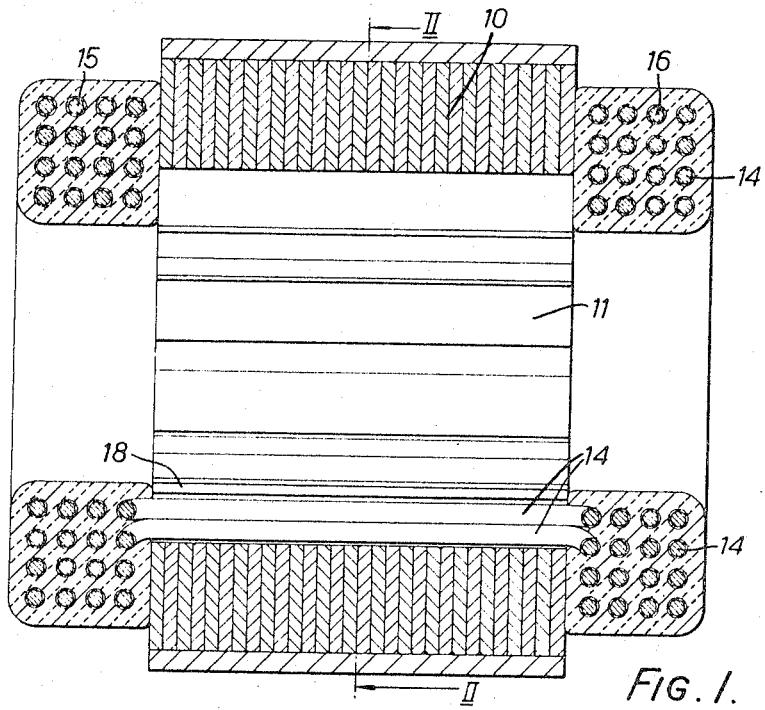
Figure 2:
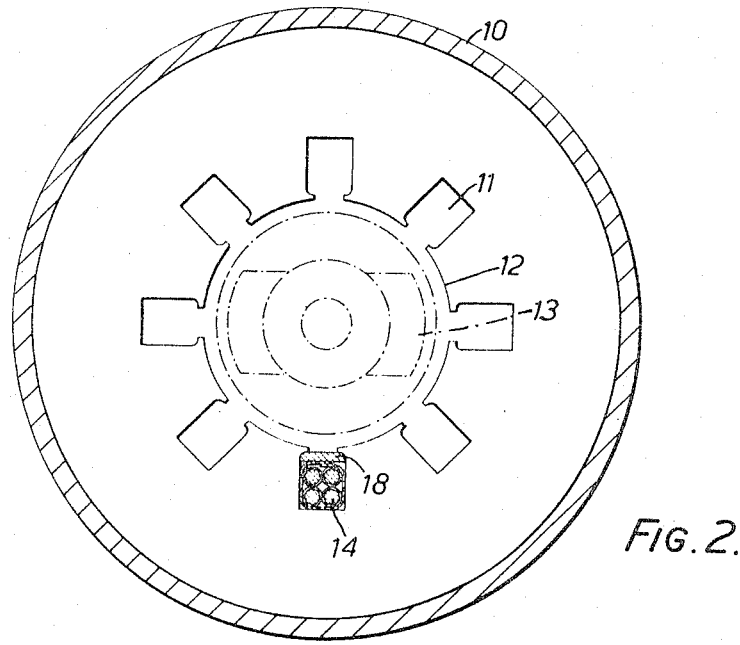

One embodiment of the invention will now be particularly described by way of example, with reference to the accompanying drawings, of which, FIGURE 1 is a diagrammatic cross-sectional side elevation of the stator assembly of an electric motor, FIGURE 2 is a cross-section of the assembly shown in FIGURE 1, taken along the line II—II on that figure.

Figure 3:
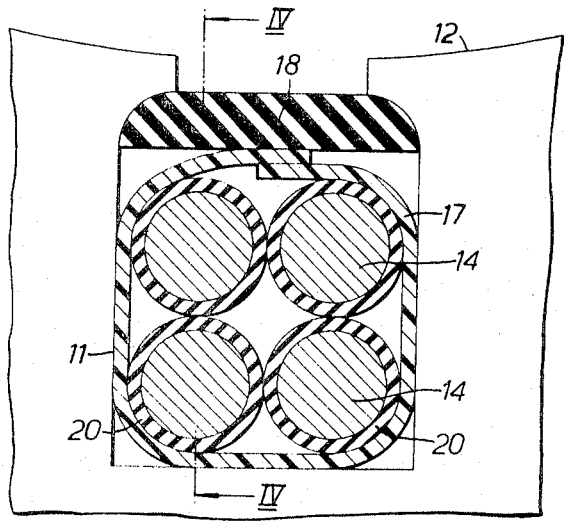
Figure 4:
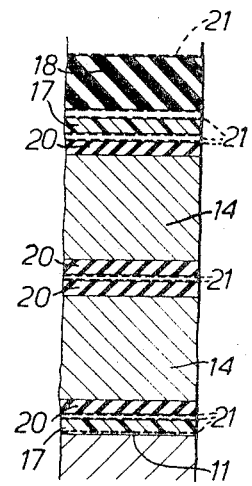
Figure 5:
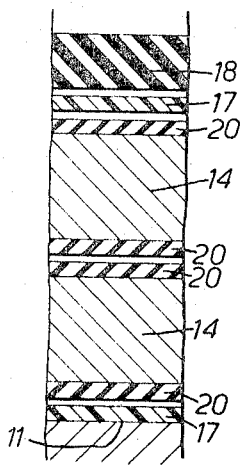
Figure 6:
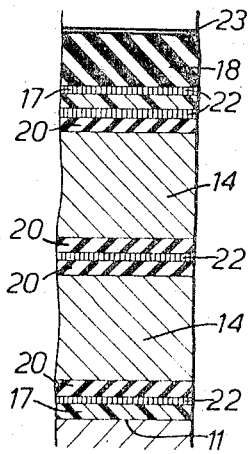

FIGURE 3 is an enlarged cross-section of a part of the stator assembly shown in FIGURE 2, and, FIGURES 4, 5 and 6 are cross-sections of a portion of the assembly shown in, and taken along the line IV—IV on, FIGURE 3.

Referring to FIGURES 1 and 2 of the drawings, a laminated former or magnetic stator core of an electric motor is shown at 10. The core 10 is provided with a plurality of slots 11 running lengthwise thereof and cut radially-outwardly from the cylindrical opening 12 in the core in which the motor armature 13 (seen only in FIGURE 2) is supported for rotation in known manner.

In conventional manner the conductors 14 of the stator assembly pass along the slots 11 (being shown only in one slot in FIGURE 2) and wrap around in overhanging manner at either end of the stator core thereby to define annular end winding formations diagrammatically represented at 15 and 16.

Suitable connections (not shown) are provided upon the stator windings whereby electrical current is supplied into the windings from a suitable source.

Referring now to FIGURE 3 each slot 11 carries four conductors 14 which are enclosed in a wrap-around slot-lining member 17 of glass fibre. Before the initial assembly stage this glass fibre is impregnated with a silicone binder.

The assembly of conductors passing through each slot is retained in place by a slot wedge 18, one for each slot, which is a sliding fit in the radially-inward portion of the slot. This wedge is also of glass fibre which before the initial assembly stage is impregnated with a silicone binder.

Each of the conductors 14 is of solid copper being insulated by a sleeving 20 which comprises inorganic glass fibre impregnated with a silicone binder.

Referring now to FIGURES 4, 5 and 6 the sequence in the method of production of the stator winding is as follows:

When the stator core has been completely wound with conductors 14 to the required number of turns, the assembly is heated by a suitable stoving process up to a temperature of 400 degrees C. to drive off organic constituents of the silicone binder from the wire sleeving 20. This has the effect of leaving behind solid silicone compounds (i.e., silica), but no carbonaceous materials of a conducting nature remain. The chain-dotted horizontal lines 21 in FIGURE 4 represent the organic constituents of the silicone binder and thus in FIGURE 5, which represents the structure following the stoving process, these chain-dotted horizontal lines are omitted.

Thus at this stage a porous structure of sufficient rigidity for careful handling remains, the stranded glass fibre of each sleeving 20 remaining around its conductor 14 being sufficient to space the wires of each conductor apart and to provide part of the insulation.

The assembly thereafter is placed in an autoclave and under vacuum is impregnated by a conventional injection process with a ceramic cement in the fluid state.

The vacuum conditions are such that this ceramic cement finds it way into the spaces between the fibres of the glass fibre material of the sleeving 20, thereby to complete the insulation in this glass-fibre "framework" of the sleeving surrounding the conductors. It also finds its way into the glass fibre of the slot wedges 18 and the slot-lining members 17. When the ceramic material in the assembly has solidified, a rigid heat-resisting and efficiently insulated structure is provided. In FIGURE 6, the ceramic cement is diagrammatically represented by vertical lines 22 to show how it occupies the spaces in the glass fibre originally occupied by the silicone binder.

Since the ceramic cement used in this embodiment is of a type which is somewhat porous to the ingress of moisture, the exposed external surfaces of the assembly so produced are coated with vitreous enamel, by a suitable process, which provides a sealant to such ingress of moisture. This coating is represented in FIGURE 6 by the double horizontal line 23.

However, in other embodiments where other ceramic and like materials which are not so porous are used, and thus do not suffer necessarily from the ingress of moisture, the enamel coating or any other similar coating is not applied.

It will be understood that during the impregnation process the structure, only insulated by the glass fibre strands around the conductors 14 is sufficiently rigid to withstand the vacuum effects.

The reason for not merely simply winding the stator core initially with conductors having only an inorganic material forming the sleeving, is because of the liability of such material (of brittle nature) and possibly in stranded form around the conductors, being so easily displaced in winding as to cause adjacent conductors to be forced into contact rather than held insulated and when immersed in the ceramic material such contacting conductors would permanently be held in electrical shorting engagement.

Although in the drawings only four conductors have been shown passing through each of the slots 13, it will be understood that a larger or smaller number of conductors can be carried along each slot.

Although in the embodiment the invention is applied to a stator assembly, it may with advantage be applied to any other form of electrical winding which in operation is required to be subjected to relatively high temperatures.

Windings in accordance with the invention are suitable for operation at temperatures as high at 400 degrees centigrade. In this respect therefore, electric motors, generators and other electrical devices incorporating such high temperature resistant windings can be used satisfactorily in the relatively high temperature-zones of supersonic aerial vehicles.

I claim as my invention:

1. An electric winding comprising in combination: a former; a plurality of conductors wound on said former; porous sleeving means disposed about each of said conductors composed of fibrous material and inorganic constituents including carbon free silica from which organic constituents of a silicone binder have been removed, the sleeving means of adjacent conductors being spaced from each other by removal of the binder; and ceramic insulating means disposed in the porous structure of said sleeving means and said spaces between adjacent portions thereof originally occupied by the organic constituents of the binder, said insulating means reinforcing the assembly and providing the remainder of the insulation of the conductors.

2. An electric winding as claimed in claim 1, wherein said fibrous material includes glass fibers.

3. An electric winding comprising a magnetic stator core forming part of a dynamo-electric machine; means defining slots in the core; a plurality of conductors wound along said slots; fibrous sleeve means disposed about each individual conductor; a plurality of fibrous slot-lining members disposed in each of said slots and enclosing a plurality of said conductors having said sleeve means thereon; and a plurality of fibrous wedge members each associated with one of said slots and wedging said conductors in the associated slot; said fibrous means and said fibrous members being composed of fibrous material from which organic constituents of a silicone binder have been removed and providing the conductors with part insulation, the remaining inorganic constituents of the fibrous material including silica but being free from carbon, and the spaces in the material originally occupied by the organic constituents of the binder being filled with a solidified ceramic material thus to reinforce the assembly and to provide the remainder of the insulation of the conductors.

4. An electric winding as claimed in claim 3, wherein the fibrous material includes glass fibers.

5. A method of producing an electric winding comprising coating conductors with silicone binder impregnated glass fibre, lining the slots of a magnetic stator core of a dynamoelectric machine with silicone binder impregnated glass fibre, winding said coated conductors in said lined slots, placing a slot wedge of silicone binder impregnated glass fibre in each slot in holding engagement with the coated conductors therein, heating the assembly to a temperature sufficient to drive off all organic constituents of the silicone binder to form a porous insulating structure in each slot and about each conductor, and impregnating the porous structures thus formed with ceramic cement.

References Cited

UNITED STATES PATENTS

| 2,711,008 | 6/1955 | Smith | 29—155.57 X |
| 2,970,936 | 2/1961 | Richardson | 174—120 X |
| 3,071,846 | 1/1963 | Wesolowski | 29—155.57 |
| 3,194,993 | 7/1965 | Hackney | 310—43 |
| 3,223,553 | 12/1965 | Morey | 336—205 |

OTHER REFERENCES

Birks, J. B.: Modern Dielectric Materials, Heywood Co., 1960, London, pp. 170–171.

LEWIS H. MYERS, *Primary Examiner.*

E. GOLDBERG, *Examiner.*